May 8, 1951  C. W. PRIBUS ET AL  2,552,213
FLASH SYNCHRONIZER FOR FOCAL PLANE TYPE CAMERA SHUTTERS
Filed April 16, 1948  2 Sheets-Sheet 1
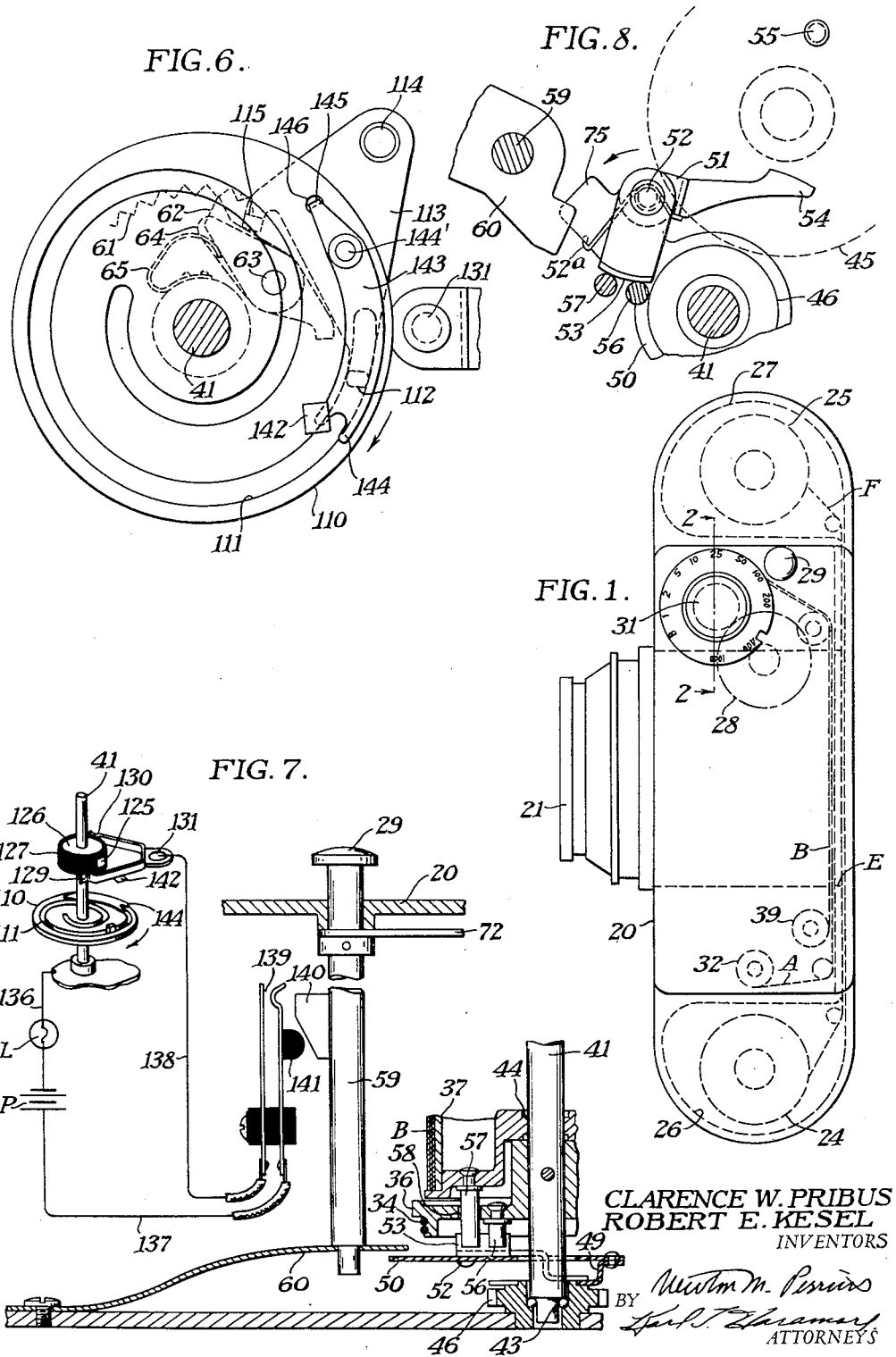
CLARENCE W. PRIBUS
ROBERT E. KESEL
INVENTORS
ATTORNEYS May 8, 1951 C. W. PRIBUS ET AL 2,552,213
FLASH SYNCHRONIZER FOR FOCAL PLANE TYPE CAMERA SHUTTERS
Filed April 16, 1948 2 Sheets-Sheet 2
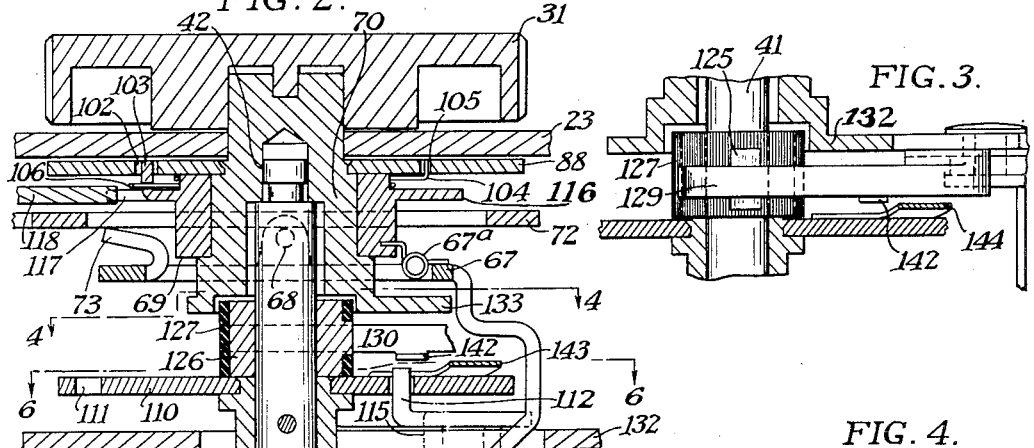
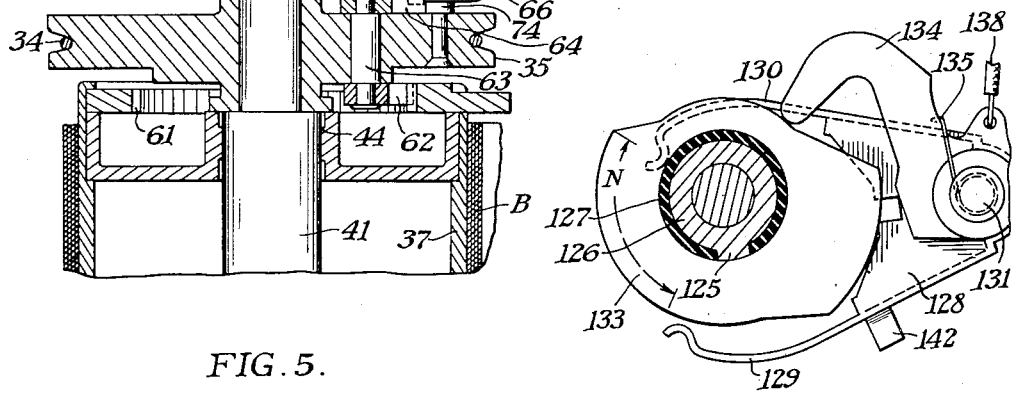
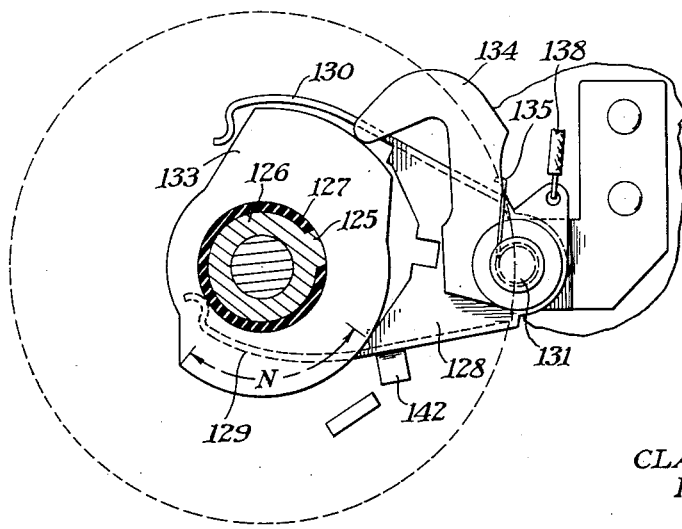
CLARENCE W. PRIBUS
ROBERT E. KESEL
INVENTORS
BY
ATTORNEYS Patented May 8, 1951

2,552,213

UNITED STATES PATENT OFFICE 2,552,213

FLASH SYNCHRONIZER FOR FOCAL PLANE TYPE CAMERA SHUTTERS

Clarence W. Pribus and Robert E. Kesel, Rochester, N. Y., assignors to Eastman Kodak Company, Rochester, N. Y., a corporation of New Jersey Application April 16, 1948, Serial No. 21,416

12 Claims. (Cl. 95—11.5)

The present invention relates to a photoflash synchronizer for cameras, and particularly to a photoflash synchronizer built into a focal plane shutter of the curtain type.

The primary object of the present invention is to provide a built-in flash synchronizer for a curtain shutter of the type disclosed in pending U. S. Patent application Serial No. 697,095, filed September 14, 1946, in the name of Joseph Mihalyi, which has been abandoned, and which curtain shutter is of the type employing two curtains in which both curtains are fully wound after each exposure, and in which one curtain may then move relative to the other only a distance sufficient to provide a slot of a predetermined width, the width of the slot and, hence, the speed of exposure, depending upon the setting of a speed dial associated with the curtain windup mechanism.

Another object is to provide a built-in flash synchronizer of the type described which includes a switch for controlling the flash lamp circuit comprising a fixed contact and a movable contact associated with the curtain-winding mechanism to close the lamp circuit upon release of the shutter in timed relation with the opening of the exposure aperture by movement of the curtain slot thereacross.

And, another object is to provide a flash synchronizer of the type set forth in which the synchronizer includes two switches which close the lamp circuit at different times after release of the shutter to synchronize the lamp with different ranges of shutter speeds, and which switches are properly selected for operation by adjustment of the shutter speed dial.

A further object is to provide a flash synchronizer of the type set forth which includes a third switch which closes every time the shutter is released and at substantially the time the leading curtain uncovers the exposure aperture, and means for rendering said first two switches inoperative when said speed dial is set for the slower exposures wherein the third switch is used for synchronization.

Another object is to provide a built-in synchronizer of the type disclosed which is capable of synchronizing the flashing of a lamp with all shutter speeds from 1/1000 of a second down to "time" and "bulb," and which is relatively simple in construction and is automatically adjusted by adjustment of the speed dial of the shutter.

And another object is to provide a flash synchronizer of the type described which includes a safety switch to prevent a closing of the lamp circuit during a setting or winding of the shutter curtains.

The novel features that we consider characteristic of our invention are set forth with particularity in the appended claims. The invention itself, however, both as to its organization and its methods of operation, together with additional objects and advantages thereof, will best be understood from the following description when read in connection with the accompanying drawings in which, Fig. 1 is a top plan view of a camera equipped with a curtain shutter of the type into which a flash synchronizer constructed in accordance with a preferred embodiment of the present invention is adapted to be built;

Fig. 2 is a partial sectional view on an enlarged scale, taken substantially on line 2—2 of Fig. 1, and showing the winding mechanism for the shutter curtains, the exposure setting for the same, and the controlling switches of the flash synchronizer;

Fig. 3 is a sectional detail taken out of Fig. 2 and showing the selective switch of the synchronizer;

Fig. 4 is a plan view of the selective switch mechanism taken substantially on line 4—4 of Fig. 2 and showing the switch adjusted for synchronizing at shutter speeds of from 1/50 through 1/100 of a second;

Fig. 5 corresponds to Fig. 4 but shows the selective switch adjusted for synchronization at speeds above 1/100 to 1/1000 of a second;

Fig. 6 is a view taken substantially on line 6—6 of Fig. 2 and showing the switch of the synchronizer which is closed every time the shutter is released and which is used to synchronize flash lamps at the slow shutter speeds, including 1/25 of a second down to "bulb" and "time";

Fig. 7 is a vertical sectional view taken substantially on line 2—2 of Fig. 1 and showing the lower end of the curtain wind-up mechanism and the shutter release. Also diagrammatically shown in this figure are the parts of the flash synchronizing mechanism including a safety switch which is operated by the shutter release; and Fig. 8 is a plan view of parts associated with the lower end of the curtain drum, and showing the parts in the position they assume when the shutter is almost fully wound and before the exposure slot is formed between the curtains.

Like reference characters refer to corresponding parts throughout the drawings.

A camera in which the present invention may be used may comprise a conventional body 20, with an objective lens assembly 21 mounted on its front wall. A film supply spool 24 and a receiving spool 25 may be housed as usual in end chambers 26 and 27, respectively, between which the film "F" may pass across an exposure aperture, indicated at "E," in the focal plane of the objective in the usual manner. A winding knob 28 is provided on the bottom wall of the camera body for winding or "setting" the shutter curtains so that they may be released by a button 29 on the top of the camera body to make an exposure. The turning of the knob 28 may also wind the film a required distance, but as this action has nothing to do with the present invention, it is not illustrated and will not be described. A dial 31 may be manually rotated to establish any selected shutter speed, including "bulb" exposures.

The curtain shutter in combination with which the present synchronizer shown is fully disclosed in the above-noted pending Mihalyi application to which reference can be had for a complete disclosure of the same. Inasmuch as the shutter per se is not part of the present invention, only so much of its structure as is necessary to understand its operation, and which acts in combination with the present synchronizer, will be described in detail in this application.

The shutter curtains are of generally conventional form and comprise a "first" curtain A and a "following" curtain B, these terms signifying the order in which the curtains move across an exposure frame when the release button 29 is depressed. As indicated in Fig. 1, the first curtain A is wound on a roller 32 which is urged clockwise (as viewed from above) by a spring encircling the hub of roller 32. The left end of curtain A includes upper and lower cords 34 which are wound on discs 35 and 36; these discs being located, respectively, above and below a drum 37 which carries the main portion of the second curtain B, see Figs. 2 and 7. This second curtain includes tapes that extend from its right edge and are secured to and wound upon a roller 39 urged clockwise by a spring, not shown, encircling the hub of the roller, and which is made stronger than the spring acting on roller 32, for a purpose to be made clear later.

The discs 35 and 36 are secured to a vertical shaft 41 carried in a sleeve bearing 42 and a thrust ball bearing 43. The drum 37 is not fixed to the shaft 41 but is revolvable on said shaft by virtue of sleeve bearings 44. This possible relative rotation enables the right end of curtain B and the left end of curtain A to overlap or be separated by varying distances to create an exposure slot which is moved across the exposure slot at a fixed speed to make the exposure, as is well known.

As in most curtain shutters, a winding or setting operation must be carried out before an exposure can be made. This operation is accomplished by a winding knob 28 journaled in the bottom wall of the camera body 20, see Fig. 1, the shaft of which carries a gear 45 that meshes with a pinion 46 half its diameter, see Fig. 8. Thus, the pinion will rotate twice for each full revolution of the winding knob 28. Attached to the pinion 46 is an offset plate 49 to which is riveted a flat spring 50 that extends past and around shaft 41 and carries a bell crank 51 on a pivot 52, see Fig. 8. Spring 52a tends to turn this bell crank 51 about pivot 52 in the direction shown by the arrow. One arm of this bell crank carries an upstanding winding lug 53 and the other arm is swelled outwardly at 54 to constitute a cam surface capable of engaging a pin 55 on gear 45. The cam surface 54 is offset downwardly to bring it into the path of travel of pin 55.

From the bottom of curtain disc 36 a pin 56 extends sufficiently to engage lug 53. A similar pin 57 depends from the lower head of the drum 37, and passing through a slot 58 in disc 36 also extends into the path of lug 53. Whenever release button 29 is depressed, the lower end of release rod 59 (an extension of button 29, see Fig. 7) depresses a flat spring 60, the end of which overlies the end of spring 50, and the latter is carried downwardly by spring 60 far enough to move the bell crank and lug 53 clear of pins 56 and 57. This will occur only when the curtains are fully wound, as will be explained later, but in a fully wound position only the one pin 57 will be engaged by the lug 53.

At the top of the drum 37 there is an internal ratchet 61 adapted to be engaged by a pawl 62. The pivot 63 of the pawl extends through the upper curtain-cord disc 35 and carries an arm 64, see Figs. 2 and 6. When release button 29 is in an elevated position, arm 64 is pressed counterclockwise, opposing the action of spring 65, by engagement with locating lug 66 that extends downwardly from a circular plate 67 that is trunnioned on pins 68 mounted in a ring 69 revolvable on a hub 70 which is, in turn, rotatable in a fixed plate in the camera body and on the upper end of shaft 41. A spring 67a, Fig. 2, tends to turn ring 67 about its pivots 68 to bring parts 73 and 72 into contact, as will be later described. The ring 67 may be tilted from a horizontal position on pivot pins 68 when button 29 is depressed, or may be rotated through a horizontal arc when ring 69 is turned by means of speed dial 31. The connection between the dial 31 and the hub 69 is a resilient one, for purposes to be described later, and includes cam 88 staked to hub 70 and including an arcuate slot 102 into which a turned-up projection 103 on ring 69 extends. The projection 103 is normally moved to one end of the slot 102 by a spring 104 encircling the ring 69 and having one end 105 fastened to the cam and the other end 106 engaging the projection 103, see Fig. 2.

If release button 29 is depressed, a ring 72 carried rigidly on shaft 59 moves downwardly without tilting, and strikes the lug 73 projecting upwardly from ring 67. The lug may be in various circumferential positions according to the setting of dial 31. When button 29, shaft 59, and ring 72 have moved downwardly far enough to start tilting the ring 67, the lug 66 will first swing outwardly and away from the end of arm 64, so that the spring 65 may force pawl 62 into engagement with ratchet 61. By a slight further movement, lug 66 is also moved out of the path of a pin 74 mounted in the upper face of disc 35. This releases both curtains from the ring 72 and, as the release 29, before releasing lug 66 from pin 74, must actuate lug 53 to release pin 57 of drum 37, the curtains are released for exposure.

As soon as curtain A reaches the end of its travel, and stops, curtain B must overrun it and must do so to close the exposure slot and make an overlap in the ends of the curtains so that during the setting operation the curtains will be wound up together and will not open the exposure aperture. To accomplish this action, the pawl and ratchet connection 62 and 61 between the two curtains must be disconnected and this is accomplished as follows: Staked to a hub on the disc 35 is a disc 110 having a spiral slot 111 formed therein, see Figs. 2 and 6. The upturned end 112 on one arm of a bell crank 113 pivoted at 114 extends upwardly into this slot while a downwardly turned end 115 on the other arm of the bell crank engages the arm 64 fixed to the pivot 63 of the pawl 62. When the curtains are fully wound, the end 112 lies at the inner end of the spiral slot 111 to determine the position of the A curtain while the position of the B curtain is determined by engagement between pin 57 fixed to drum 37 engaging one end of the slot 58 in the disc 36.

When the curtains are released to make an exposure, disc 110 rotates clockwise and the movement of the A curtain is stopped when end 112 on bell crank 113 reaches the outer end of spiral slot 111. As the disc 110 rotates, the bell crank 113 is slowly pivoted counterclockwise by the action of the end 112 on one arm thereof being moved outwardly due to its engagement with the spiral slot 111 until just before the A curtain reaches the end of its run-down travel, but after it has crossed the exposure aperture, the downturned end 115 on the bell crank pivots the pawl 62 out of engagement with the ratchet 61. The B curtain is thus freed from the A curtain and can continue to run down independently of curtain A under the action of its own spring until pin 57 reaches the other end of slot 58. The ends of the spiral slot 111 and the slot 58 in the disc 36 are of such relative length that the curtain B is allowed sufficient run-down travel relative to curtain A to allow their adjacent ends to overlap.

When the curtains have come to rest in their run-down position, the two pins 56 and 57 will lie in side-by-side relation approximately 180° from the position shown in Fig. 8 while the bell crank and pivot 51—52 will be in the position shown in this figure. In Fig. 8 these parts are shown in the position they assume when the curtains are substantially fully wound but just before curtain A has been released to form the exposure slot. Upon rotation of the winding knob 28 clockwise the pinion 45 will rotate counterclockwise. The end 75 of spring 50 immediately is moved out from under the end of spring 60, so that if button 29 is pressed nothing happens. As the knob 28 is turned further, pinion 46 (revolving at twice the rate of gear 45) after one-half revolution, carries lug 53 against pins 56 and 57. As the rotation progresses, both the discs 35 and 36, and shaft 41 to which they are fixed, and the drum 37 which is free on the shaft, are all rotated counterclockwise together by lug 53 and pins 56 and 57. The pin 74 has a beveled upper face so that it will readily pass under lug 66 when rotating in this direction, and the ring 67 will tilt about its pivots 68, Fig. 2, and against the pressure of spring 67a. When pin 74 has passed lug 66, the ring 67 will be restored to its normal, or Fig. 2, position.

After the pinion 46 has made substantially two revolutions and the pins 56 and 57 have made one and a half revolution from the full run-down position, the curtains are substantially fully wound and the parts assume the position shown in Fig. 8. The remaining allowable rotation of gear 45 brings the end 75 of spring 50 directly under the end of spring 60 and pin 55 on gear 45 engages the cam surface 54 and pivots bell crank 51 to a position in which lug 53 thereon releases pin 56 but not pin 57. This allows curtain A to run down under the action of its spring until pin 74 engages lug 66 where it is stopped. This allows the formation of the exposure slot between the ends of the curtains of the desired width, said width being determined by the position of lug 66 as set by speed dial 31. If the lug 66 is so placed, by means of dial 31, that this movement is only a few degrees and a narrow slot is formed, a fast exposure will result. If it is further around so that pin 74 may move through an arc of approximately 300 degrees, the slot width will take care of an exposure of $\frac{1}{25}$ second, or longer. All of the above action occurs during winding and before release button 29 is depressed.

The mechanism providing for control of the slow exposures from $\frac{1}{10}$ second to 1 second is the same as described in the above-noted Mihalyi application, Serial No. 697,095, and will not be described herein in detail. It will suffice to say that this mechanism essentially consists of a conventional gear-and-pallet retard train which is adapted to be connected with the following curtain for selectively different periods during its run-down to retard the curtain movement. It includes an arm which is thrown into the path of pin 57 on the curtain drum 37 and the position which this arm takes relative to the path of movement of pin 57 is controlled by peripheral cam 88 forming a part of the resilient connection between the dial 31 and the ring 69. The periphery of this cam 88 is engaged by a spring-pressed arm which, in turn, controls the position of the arm of the gear retard relative to the path of pin 57 on drum 37.

It is desirable, and in fact may be necessary, that the width of the curtain slot for exposures of $\frac{1}{10}$ to "B" should not be greater than for a $\frac{1}{25}$ second exposure, because if it were, the curtains would have to be much longer. It is for this reason that the yielding connection between dial 31 and the ring 69 is provided. The ring 69 is provided with a flange 116 including a stop surface 117 adjacent the upturned projection 103 which is adapted to engage an abutment 118 in the camera when the dial 31 and ring 69 are adjusted to the positions they assume to give a $\frac{1}{25}$ second exposure. By virtue of the pin-and-slot and resilient connection between the cam 88 and the ring 69, the dial and cam can be adjusted further to the slower exposures of $\frac{1}{10}$ to 1 second without causing the ring 69 to be moved beyond the position in which the lug 66 thereon defines the curtain slot width for a $\frac{1}{25}$ second exposure. The mechanism for providing for a "bulb" exposure may be exactly the same as in the noted Mihalyi patent application, and since it constitutes no part of the present invention, it is not described herein.

Coming now to the problem of providing this shutter with a flash synchronizer, it is well known to those skilled in the art that a focal plane shutter requires what is known as a focal plane type of flash lamp. The flashing characteristics of these lamps are such that they have a peak of illumination, often referred to as the plateau of maximum illumination, which is reached between 15 to 20 milliseconds after the lamp circuit is closed and remains substantially constant for the time which it takes the curtain slot to cross the exposure aperture. There are at least two different focal plane-type flash lamps on the market at the present time, and which are universally used and which differ primarily in the difference in the length of their plateau of maximum illumination, but also in the amount of their maximum illumination. One of these, which we will refer to as the small lamp, because it is smaller physically than the other, has a plateau of maximum illumination of between 24–30 milliseconds duration. The other of these lamps, which we will refer to as the large lamp, has a plateau of maximum illumination of approximately 40 milliseconds and its brightness is more than the smaller lamp. In the present instance, the smaller focal plane-type flash lamp is recommended for use with shutter speeds within the range of $1/1000$ to $1/100$ of a second, because the slot between the shutter curtains for each of these speeds will travel across the exposure slot in the camera within 24 milliseconds. For the $1/50$ shutter speed, however, we recommend the use of the larger lamp because with the shutter slot required for this exposure, the trailing curtain does not complete its travel across the exposure aperture within the 24 milliseconds allowed by the smaller lamp, and the exposure at the end of the frame begins to drop off.

In order to bring the plateau of maximum illumination from the flash lamp to occur during the transit time of the shutter slot across the exposure aperture, it is necessary to alter the firing point of the lamp if synchronization is desired over a wide speed range. In accordance with the present invention, the firing point of the lamp is varied with respect to the position of the first curtain A relative to the exposure aperture.

The present synchronizer includes a switch operated by the curtain mechanism and which includes a first contact 125 constituting a projection on a metal collar 126 fastened to the shaft 41 to rotate therewith. The rest of the periphery of the collar is covered by a layer 127 of insulating material. It will thus be observed that this contact 125 will move clockwise, looking at Figs. 4 and 5, with the curtain A as it moves from a fully wound position. The second contact of the switch is a brush contact 128 which resembles a wishbone and has two contact arms 129 and 130. This brush contact is pivotally mounted on a stud 131 fixed to and insulated from a stationary plate 132 in the camera with the arms 129 and 130 thereof embracing the shaft 41 and the path of contact 125.

In order to obtain synchronization with shutter speeds from 1/1000 of a second down through $1/100$ of a second, the lamp must be at full peak of illumination by the time the edge of the leading curtain A reaches and starts to cross the exposure aperture. This means that the lamp circuit must be closed by the switch at an instant in advance of the edge of curtain A reaching the exposure aperture which is equal to the lag of the lamp (which time may be 15–20 milliseconds). Therefore, for exposure speeds of $1/1000$ of a second down to $1/50$ of a second, the brush contact 128 is pivoted clockwise to the position shown in Fig. 5 where the end of arm 129 is in position to be wiped by contact 125 as the curtains run off and arm 130 is removed from the path of contact 125.

Remembering that contact 125 is driven by the leading curtain A, it will be understood that the position of contact 125 when the shutter is wound will depend upon how far the curtain A drops back from curtain B to form the exposure slot between the curtains. When the exposure is set for $1/100$ of a second, or slower, in forming the exposure slot, the curtain A drops back far enough to bring the contact 125 to the left of contact arm 129. This will be obvious from an inspection of Fig. 4 wherein the contact 125 is shown in the position it assumes when a $1/100$ of a second exposure slot is formed by the curtains. Accordingly, to obtain synchronization at these slower shutter speeds, the brush contact 128 is pivoted counterclockwise to move contact arm 130 into the path of contact 125 and contact arm 129 out of operative position, see Fig. 4.

To automatically set the brush contact 128 in the proper position in accordance with the selected shutter speed, the following structure is provided. On the end of hub 70 fixed to speed dial 31 there is a cam 133 which is rotated with the speed dial. A cam follower 134 mounted on stud 131 and connected to brush contact 128 has its end normally pressed against the cam 133 by a spring 135. This cam follower is made of an insulating material to prevent short-circuiting of the lamp circuit. This cam is so formed and located relative to speed dial 31 that when the dial is set for exposures of $1/1000$ of a second down to $1/150$ of a second, the follower engages that portion of the periphery as shown in Fig. 5 and the brush contact 128 is moved to the position where contact arm 129 is in operative position. On the other hand, when the speed dial is set for exposures of $1/100$ and $1/50$ of a second, the cam is rotated to the position wherein the follower engages the portion of the cam having the least radius, see Fig. 4, and the brush contact 128 is moved to bring contact arm 130 into operative relation relative to movable contact 125. We have found that when using a $1/50$ of a second exposure the following curtain takes a little more than 24 milliseconds to reach the end of the exposure aperture after the edge leading curtain reaches the aperture. Accordingly, to obtain a uniform exposure over the complete picture frame at a $1/50$ of a second exposure, it is recommended that the large focal plane type of lamp be used inasmuch as this lamp has a plateau of maximum illumination of at least 40 milliseconds.

As shown in Fig. 7, the contact 125 may be connected to one side of the lamp circuit including lamp L and battery B by having one side of the circuit grounded through the camera mechanism by lead 136. The other side of the circuit is connected by leads 137 and 138 to the brush contact 128 directly. The lamp and battery may be carried by a flashholder, not shown, and may be connected in circuit by mounting the flashholder on the camera or may be connected in circuit by a separate cord having a plug engaging a socket in the camera wall, as is well known and not shown herein. To prevent the lamp circuit from being closed during setting, or winding of the shutter, leads 137 and 138 are broken by a normally open safety switch 139. This switch is closed just in advance of release of the shutter when a cam-shaped lug 140 on the rod 59 engages a protuberance 141, made of insulating material, which is carried by one of the switch contacts, see Fig. 7.

In making exposures of $1/25$ of a second and slower, the slot between the shutter curtains is always wider than the length of the exposure aperture so that the edge of the leading curtain will be across the aperture before the edge of the following curtain starts across the aperture.

Since the entire exposure aperture is always completely open at one instant during each of these slower speeds, the synchronization problem requires only that the lamp be fired during the time the aperture is thus completely uncovered. According to the present invention, this is accomplished by having the lamp circuit closed by a part of the curtain mechanism associated with the leading curtain so that the lamp will be fired and reach its peak at substantially the time the edge of the leading curtain has crossed the exposure aperture.

To this end, we provide a second switch including a stationary contact which is a lug 142 forming a part of and extending from the lower edge of the brush contact 128, see Figs. 2-7. The other, or movable contact, of this switch comprises a spring member 143 fastened to the disc 110 by a rivet 144' and having a resilient end 144 extending over the outer end of the spiral slot 111 in the disc. The other end of member 143 has a turned-down end 145 engaging a hole 146 in the disc to prevent the member from pivoting on its rivet mounting. As clearly shown in Figs. 2, 6, and 7, when the leading curtain A approaches the end of its travel across the exposure aperture, spiral slotted disc 110 reaches the position shown in Fig. 6 wherein the pin 112 engages the lower surface of the resilient end 144 of member 143 and cams the same up into engagement with lug or contact 142 to close the lamp circuit. While this switch closes every time the shutter is released, this second switch will not control the lamp circuit if the speed dial is set for a speed faster than 1/25 of a second and one of contact arms 129 or 130 are in operative position relative to contact 125 of the first-mentioned switch.

In order to allow this second switch to control the lamp circuit, the cam has a portion on its periphery designated by arc N in Figs. 4 and 5 which, when the speed dial is set for speeds of 1/25 of a second and slower, will cause the follower 134 to move the brush contact to an intermediate position where both of the contact arms 129 and 130 are moved to an inoperative position. When using shutter speeds in the range of 1/25 of a second, or less, different types of flash lamps may be used, regardless of their peak characteristic, because the full exposure aperture is open during the flash and will include the peak of the flash. If the contact 144 is stationary as shown, it will be so positioned relative to the end of the spiral slot 111 in disc 110 that if flash lamps, having no lag or a lag of less than five milliseconds, are used with shutter speeds of 1/25 of a second, the lamp will reach its peak of illumination after the leading curtain A has fully uncovered the exposure aperture and before the trailing curtain B has started across the aperture. This same arrangement of contacts 144 and 142 will also serve to produce synchronism at the slower shutter speeds down to "bulb" if lamps having the longer lag characteristic of from 15 to 20 milliseconds are used. This is true because at these slower shutter speeds the time elapsing between the instant the leading curtain crosses the exposure aperture and the instant the following curtain moves into the exposure aperture will accommodate the lag of the slowest firing flash lamps. Even though the contacts 144 and 142 of the second switch remain in engagement until the shutter is wound or set, if a lamp is placed in the flashholder before the shutter is set it will not be accidentally set off because the circuit is opened by the safety switch 139 controlled by the shutter release button 29 and rod 59 associated therewith. In Fig. 7 we have attempted to show the complete lamp circuit in association with the parts of the curtain mechanism which operate the switches of the circuit. It is pointed out, however, that the shape and relative positions of the curtain mechanism have necessarily been exaggerated and have been relatively displaced (see shaft 41) in order to bring out their circuit controlling function. Although we have shown the contact 144 of the second switch in a fixed position whereby different ones of the slower shutter speeds have to be synchronized by a choice of different flash lamps, it will be appreciated that this contact could be made adjustable relative to the end of the spiral slot 111 in accordance with a suitable scale, whereby any one of the slower shutter speeds could be synchronized with flash lamps having all of the different lag characteristics.

It will thus be seen that we have provided a built-in flash synchronizer for a focal plane camera shutter which does not require the switch contacts to be carried by the curtains themselves but will provide synchronization at all shutter speeds. To our knowledge, this has never been achieved in a focal plane shutter synchronizer before. The switches controlling the flash circuit are so arranged and combined with the speed-setting dial that the synchronizer is automatically adjusted for use at the different shutter speeds by the single operation of setting the shutter for that speed. The synchronizer mechanism is so combined with the shutter curtain mechanism that it presence does not effect the normal operation of the shutter or tend to slow down the shutter below the speeds desired.

Although we have shown and described certain specific embodiments of our invention, we are fully aware that many modifications thereof are possible. Our invention, therefore, is not to be limited to the precise details of construction shown and described but is intended to cover all modifications coming within the scope of the appended claims.

Having thus described our invention, what we claim is new and desire to secure by Letters Patent of the United States is:

1. In a photographic camera provided with an exposure aperture, the combination with a focal plane shutter including a leading curtain and a following curtain both adapted to move across said exposure aperture with their adjacent ends in spaced relation to form an exposure slot when released to make an exposure, a separate rewind roller for each curtain, a separate take-up tension roller for each curtain, means for adjusting the width of said exposure slot to alter the exposure time of the shutter; of a photoflash synchronizing arrangement comprising an electric circuit including a flash lamp, a switch in said circuit including a normally stationary contact and a movable contact, means directly and positively connecting said movable contact to a moving part of said shutter mechanism to move it into engagement with said stationary contact during exposure movement of the curtains to close said circuit in proper timed relation with movement of said exposure slot across said aperture to effect synchronization, means for operatively connecting said stationary contact with the exposure time adjusting means and the rewind roller of said leading curtain whereby it will be properly adjusted relative to the movable contact to close the lamp circuit in proper timed relation in accordance with the speed setting of the shutter.

2. In a photographic camera provided with an exposure aperture, the combination with a focal plane shutter including a leading curtain and a following curtain both adapted to move across said exposure aperture with their adjacent ends in spaced relation to form an exposure slot when released to make an exposure, a separate rewind roller for each curtain, a separate take-up tension roller for each curtain; means for varying the effective width of said exposure slot to alter the exposure time of the shutter; of a photoflash synchronizing arrangement comprising an electric circuit including a flash lamp and also including a pair of switch contacts for closing said circuit in effecting synchronization, one of said contacts being movable and connected to the rewind roller of said leading curtain to be moved over a given path as said curtain moves, the second of said contacts normally being stationary and adapted to be engaged by said movable contact to close the circuit in proper timed relation with movement of the exposure slot relative to said exposure aperture to effect synchronization, means for adjusting said second contact relative to the path of movement of said movable contact for altering the time of closing of said circuit, said second contact connected to said exposure slot-adjusting means so that its position is adjusted by said slot-adjusting means to effect synchronization in accordance with any selected shutter speed.

3. In a photographic camera provided with an exposure aperture, the combination with a focal plane shutter including a leading curtain and a following curtain both adapted to move across said exposure aperture with their adjacent ends in spaced relation to form an exposure slot when released to make an exposure, a separate rewind roller for each curtain, a separate take-up tension roller for each curtain, means for varying the effective width of said exposure slot to alter the exposure time of the shutter; of a flashlight synchronizing arrangement comprising an electric circuit including a flash lamp and also including a pair of switch contacts for closing said circuit in effecting synchronization, one of said contacts being connected to the rewind roller of the leading curtain to be moved in a circular path as the curtain moves, the second of said contacts consisting of a pair of contact arms connected together at one end and having their other ends diverging so as to be spaced by an amount greater than the diameter of the path of said movable contact, means for pivoting said second contact to one side of said path of movement of the first contact with the spaced ends of the contact arms thereof disposed on opposite sides of said path of movement to move between two positions so that one or the other of said contact arms can be moved into the path of said first contact at different points in said path to effect synchronization in accordance with different ranges of shutter speeds, and means for adjusting said second contact between its two positions including a cam connected to and adjusted by the means for varying the width of said exposure slot.

4. A combined focal plane shutter and flash synchronizer according to claim 3, in which the rewind roller for said leading curtain includes a shaft rotatable therewith, the first of said switch contacts mounted on the periphery of said shaft to rotate therewith as the leading curtain moves, the two arms of said second contact of the switch embracing said shaft so that the ends thereof will engage different arcuately spaced points on said shaft as said second contact is moved between its two positions, whereby the flash circuit will be completed at different times during the release movement of the shutter to effect synchronization in accordance with the speed setting of the shutter.

5. In a photographic camera provided with an exposure aperture, the combination with a focal plane shutter including a leading curtain and a following curtain, both adapted to move across said exposure aperture with the trailing edge of the leading curtain and the leading edge of the following curtain in spaced relation to form an exposure slot when released to make an exposure, a separate rewind roller for each curtain, a separate take-up tension roller for each curtain; a shaft rotatable with the rewind roller of the leading curtain; means for varying the effective width of said exposure slot to alter the exposure time of the shutter and including a rotatable speed dial which is adapted to locate a stop for the leading curtain and control the amount said curtain can move independently of said following curtain from a set condition before the two curtains are released for simultaneous movement across the exposure aperture in connected relation, of a flashlight synchronizing arrangement comprising an electric circuit adapted to include a flashlamp and also including a pair of switch contacts for closing said circuit in effecting synchronization, one of said contacts being connected to the periphery of said shaft, the second of said contacts being stationary and adapted to be engaged by said first contact with a wiping action during movement of the leading curtain after release of the same for exposure purposes, said second contact movably mounted so that it can be adjusted relative to said shaft to vary the time at which said circuit is closed relative to the speed setting of the shutter to effect synchronization at the different shutter speeds, and means for connecting said second contact with said speed dial whereby the contact will be automatically adjusted during the speed adjustment of the shutter to effect synchronization at the selected shutter speed.

6. A combined focal plane shutter and flash synchronizer according to claim 5, in which the adjusting means for said second switch contact includes a cam follower connected to said contact, and a cam connected to and adjusted by said speed dial adapted to be normally engaged by said cam follower.

7. A combine focal plane shutter and flash synchronizer according to claim 5, in which said second switch contact comprises a pivoted double-armed member movable between two positions, one position in which one of its arms is located to be engaged by said first contact during the early part of the movement of said curtains across said exposure aperture, and a second position in which said first-mentioned arm is removed from the path of said first contact and the second arm is moved into the path of said first contact during a latter part of the movement of said curtains across said exposure aperture, and a cam associated with said speed dial for adjusting said second contact between its two positions to synchronize the flashing of the lamp with any selected shutter speed.

8. A combined focal plane shutter and flash synchronizer according to claim 5, including a second switch in said circuit for controlling the circuit independently of said first switch and comprising a stationary contact and a movable contact, means for operatively connecting said movable contact with said curtain-moving mechanism to be moved into circuit-closing engagement with said stationary contact at the time said leading curtain approaches the end of its travel from a set condition, to effect synchronization at slow shutter speeds (i. e. 1/25 of a second and slower) and means for rendering said first switch inoperative when the speed dial is set for said slow shutter speeds, whereby said second switch controls the flashing of the lamp.

9. A combined focal plane shutter and flash synchronizer according to claim 5, in which said shutter mechanism includes means for positively limiting the run-down movement of the leading curtain from a set position, and including a second switch in said circuit for controlling the circuit independently of said first switch and comprising the stationary contact of said first switch and a movable contact normally spring-pressed to a switch-open position relative to said stationary contact, said movable contact so arranged that it is adapted to be engaged by a part of said leading curtain limiting means as said curtain approaches its run-down position of rest and be moved into engagement with said stationary contact to close the flash circuit to effect synchronization at slow shutter speeds (i. e. 1/25 of a second and slower) and means for rendering said first switch inoperative when the speed dial is set for said slow shutter speeds, whereby said second switch controls the flashing of the lamp.

10. In a photographic camera provided with an exposure aperture, the combination with a focal plane shutter including a leading curtain and a following curtain both adapted to move across said exposure aperture with their adjacent ends in spaced relation to form an exposure slot when released to make an exposure, a separate rewind roller for each curtain, a separate take-up tension roller for each curtain, means for adjusting the width of said exposure slot to alter the exposure time of the shutter; of a photoflash synchronizing arrangement comprising an electric circuit including a flash lamp, a switch in said circuit including a stationary contact and a movable contact, means connecting said movable contact to a moving part of said shutter mechanism to move it into engagement with said stationary contact during exposure movement of the curtains to close said circuit in proper timed relation with movement of said exposure slot across said aperture to effect synchronization, means for operatively connecting one of said contacts with the exposure time adjusting means and the rewind roller of said leading curtain whereby it will be properly adjusted relative to the other contact to close the lamp circuit in proper timed relation in accordance with the speed setting of the shutter, a second switch in said electric circuit in parallel with said first switch, and comprising a stationary first contact, a movable second contact, means for operatively connecting said movable contact with said rewind roller of the leading curtain to move said contact into engagement with said first contact when said leading curtain substantially reaches the end of its travel across the exposure aperture during an exposure, whereby synchronization for slow shutter speeds (i. e., 1/25 of a second and slower) is accomplished by this second switch, and means for rendering said first switch inoperative when said exposure slot-adjusting means is adjusted for said slow shutter speeds.

11. In a photographic camera provided with an exposure aperture, the combination with a focal plane shutter including a leading curtain and a following curtain both adapted to move across said exposure aperture with their adjacent ends in spaced relation to form an exposure slot when released to make an exposure, a separate rewind roller for each curtain, a separate take-up tension roller for each curtain, means for adjusting the width of said exposure slot to alter the exposure time of the shutter; of a photoflash synchronizing arrangement comprising an electric circuit including a flash lamp, a switch in said circuit including a stationary contact and a movable contact, means connecting said movable contact to a moving part of said shutter mechanism to move it into engagement with said stationary contact during exposure movement of the curtains to close said circuit in proper timed relation with movement of said exposure slot across said aperture to effect synchronization, means for operatively connecting one of said contacts with the exposure time adjusting means and the rewind roller of said leading curtain whereby it will be properly adjusted relative to the other contact to close the lamp circuit in proper timed relation in accordance with the speed setting of the shutter, a second switch in said electric circuit for controlling said circuit independently of said first switch, and comprising a stationary contact which is the stationary contact of said first switch, a third contact normally spaced from said stationary contact when the shutter is set and movable into circuit-closing engagement with said stationary contact, a part movable in conjunction with said rewind roller of said leading curtain for moving said third contact into switch-closing engagement with said stationary contact just before said rewind roller reaches its full run-down position, whereby synchronization for slow shutter speeds (i. e., 1/25 of a second and slower) is accomplished by this second switch, and means for rendering said first switch inoperative when said exposure slot-adjusting means is adjusted for said slow shutter speeds.

12. In a photographic camera provided with an exposure aperture, the combination with a focal plane shutter including a leading curtain and a following curtain both adapted to move across said exposure aperture with their adjacent ends in spaced relation to form an exposure slot when released to make an exposure, a separate rewind roller for each curtain, a separate take-up tension roller for each curtain, means for adjusting the width of said exposure slot to alter the exposure time of the shutter; of a photoflash synchronizing arrangement comprising an electric circuit including a flash lamp, a switch in said circuit including a stationary contact and a movable contact, means connecting said movable contact to a moving part of said shutter mechanism to move it into engagement with said stationary contact during exposure movement of the curtains to close said circuit in proper timed relation with movement of said exposure slot across said aperture to effect synchronization, means for operatively connecting one of said contacts with the exposure time adjusting means and the rewind roller of said leading curtain whereby it will be properly adjusted relative to the other contact to close the lamp circuit in proper timed relation in accordance with the speed setting of the shutter, a second switch in said electric circuit for controlling said circuit independently of said first switch, and comprising a stationary contact which is the stationary contact of said first switch, a third contact normally spaced from said stationary contact when the shutter is set and movable into circuit closing engagement with said stationary contact, a part movable in conjunction with said rewind roller of said leading curtain for moving said third contact into switch closing engagement with said stationary contact just before said rewind roller reaches its full rundown position, whereby synchronization for slow shutter speeds (i. e., $1/25$ of a second and slower) is accomplished by this second switch, and in which the connection between said stationary contact and said exposure slot-adjusting means is such that said stationary contact is moved out of the path of the movable contact of the first switch when said exposure slot-adjusting means is set for slow shutter speeds (i. e., $1/25$ of a second and slower), whereby said first switch is rendered inoperative and said second switch controls the circuit to effect synchronization at the slow shutter speeds.

CLARENCE W. PRIBUS.
ROBERT E. KESEL.

REFERENCES CITED

The following references are of record in the file of this patent:

UNITED STATES PATENTS

| Number | Name | Date |
|---|---|---|
| 2,291,190 | Schwartz et al. | July 28, 1942 |
| 2,304,035 | Steiner | Dec. 1, 1942 |
| 2,344,472 | Steiner | Mar. 14, 1944 |
| 2,406,691 | Jacobson et al. | Aug. 27, 1946 |
| 2,455,365 | Jenner | Dec. 7, 1948 |